US012811132B2

(12) United States Patent
Han et al.

(10) Patent No.: US 12,811,132 B2
(45) Date of Patent: Nov. 24, 2026

(54) LITHIUM SECONDARY BATTERY, SECONDARY BATTERY MODULE, AND SECONDARY BATTERY PACK

(71) Applicant: SK ON CO., LTD., Seoul (KR)

(72) Inventors: Jun Hee Han, Daejeon (KR); Moon Sung Kim, Daejeon (KR); Hyo Mi Kim, Daejeon (KR); Sang Baek Ryu, Daejeon (KR); Da Hye Park, Daejeon (KR); Sang In Bang, Daejeon (KR); Seung Hyun Yook, Daejeon (KR); Hwan Ho Jang, Daejeon (KR); Da Bin Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 599 days.

(21) Appl. No.: 18/363,746

(22) Filed: Aug. 2, 2023

(65) Prior Publication Data

US 2024/0097104 A1 Mar. 21, 2024

(30) Foreign Application Priority Data

Sep. 21, 2022 (KR) ........................ 10-2022-0119522

(51) Int. Cl.
*H01M 4/134* (2010.01)
*H01M 4/133* (2010.01)
(Continued)

(52) U.S. Cl.
CPC ........... *H01M 4/134* (2013.01); *H01M 4/133* (2013.01); *H01M 4/364* (2013.01); *H01M 4/366* (2013.01);
(Continued)

(58) Field of Classification Search
CPC ...... H01M 4/134; H01M 4/133; H01M 4/364; H01M 4/366; H01M 4/483; H01M 4/587;
(Continued)

(56) References Cited

U.S. PATENT DOCUMENTS

2021/0119200 A1* 4/2021 Nam .................... H01M 4/131
2021/0218019 A1 7/2021 Tamura et al.
(Continued)

FOREIGN PATENT DOCUMENTS

KR 10-2019-0064480 A 6/2019
KR 10-2021-0096814 A 8/2021
(Continued)

OTHER PUBLICATIONS

WO_2019230297 English Translation (Year: 2019).*
(Continued)

*Primary Examiner* — Jimmy Vo
(74) *Attorney, Agent, or Firm* — IP & T GROUP LLP

(57) ABSTRACT

The technology and implementations disclosed in this patent document generally relate to a lithium secondary battery including: a first unit cell including a first anode including a 1-1 anode mixture layer and a 1-2 anode mixture layer on the 1-1 anode mixture layer, and a second unit cell including a second anode including a 2-1 anode mixture layer and a 2-2 anode mixture layer on the 2-1 anode mixture layer, wherein a weight ratio of the silicon-based active material in the 1-2 anode mixture layer is greater than a weight ratio of the silicon-based active material in the 1-1 anode mixture layer, and a weight ratio of the silicon-based active material in the 2-2 anode mixture layer is less than or equal to a weight ratio of the silicon-based active material in the 2-1 anode mixture layer.

17 Claims, 8 Drawing Sheets

(51) Int. Cl.

| | |
|---|---|
| ***H01M 4/36*** | (2006.01) |
| ***H01M 4/48*** | (2010.01) |
| ***H01M 4/587*** | (2010.01) |
| ***H01M 10/0525*** | (2010.01) |
| ***H01M 10/0585*** | (2010.01) |
| ***H01M 50/533*** | (2021.01) |
| *H01M 4/02* | (2006.01) |

(52) U.S. Cl.
CPC ........... *H01M 4/483* (2013.01); *H01M 4/587* (2013.01); *H01M 10/0525* (2013.01); *H01M 10/0585* (2013.01); *H01M 50/533* (2021.01); *H01M 2004/021* (2013.01); *H01M 2004/027* (2013.01)

(58) Field of Classification Search
CPC ......... H01M 10/0525; H01M 10/0585; H01M 50/533
See application file for complete search history.

(56) References Cited

U.S. PATENT DOCUMENTS

| | | | | |
|---|---|---|---|---|
| 2021/0234191 | A1 | 7/2021 | Lee et al. | |
| 2022/0131131 | A1 * | 4/2022 | Natsumeda ........... | H01M 4/386 |

FOREIGN PATENT DOCUMENTS

| | | | | | |
|---|---|---|---|---|---|
| KR | 10-2022-0003213 | A | | 1/2022 | |
| WO | WO-2019230297 | A1 | * | 12/2019 | ............ H01M 4/483 |
| WO | WO-2021057483 | A1 | * | 4/2021 | ........ H01M 10/0585 |

OTHER PUBLICATIONS

WO_2021057483 English Translation (Year: 2021).*
Office Action for Korean Patent Application No. 10-2022-0119522 issued by the Korean Patent Office on Aug. 21, 2026.

* cited by examiner

LITHIUM SECONDARY BATTERY, SECONDARY BATTERY MODULE, AND SECONDARY BATTERY PACK

CROSS-REFERENCE TO RELATED APPLICATION(S)

This patent document claims the priority and benefits of Korean Patent Application No. 10-2022-0119522 filed on Sep. 21, 2022, the disclosure of which is incorporated herein by reference in its entirety.

TECHNICAL FIELD

The technology and implementations disclosed in this patent document generally relate to a lithium secondary battery, a secondary battery module, and a secondary battery pack, and more particularly, to a high-capacity lithium secondary battery including two types of electrode groups and having excellent lifespan characteristics, output characteristics, and the like.

BACKGROUND

As interest in environmental issues has grown recently, a lot of research into electric vehicles (EVs), hybrid electric vehicles (HEVs) and the like, which may replace vehicles that use fossil fuels, such as gasoline vehicles and diesel vehicles, which are one of the main causes of air pollution, is being conducted. As a power source for such electric vehicles (EVs), hybrid electric vehicles (HEVs) and the like, lithium secondary batteries having high discharge voltage and output stability are mainly used. In addition, as the need for high-energy secondary batteries with high energy density increases, development of and research into high-capacity anodes are also being actively conducted.

Recently, to implement a secondary battery with high capacity and high energy density, a silicon-based active material having a higher discharge capacity as compared with graphite has been applied to an anode for a secondary battery. However, as such a silicon-based active material has a higher volume expansion rate than graphite and may cause relatively high contraction/expansion during repetitive charge/discharge processes of batteries, and thus, exfoliation of the active material layer, an increase in internal resistance of the electrode, side reaction with the electrolyte solution, deterioration of lifespan characteristics of the electrode, and the like may occur. In addition, research into rapid charging of secondary batteries has recently been actively conducted, and to this end, high-output characteristics of secondary batteries are required.

SUMMARY

The disclosed technology may be implemented in some embodiments to provide a secondary battery having excellent energy density, lifespan characteristics and the like, by including two types of electrode groups with different multilayer structure designs of anodes containing silicon-based active materials.

In addition, the disclosed technology may be implemented in some embodiments to provide a secondary battery having excellent rapid charging characteristics, output characteristics and the like by including two types of electrode groups having different electrochemical characteristics in one electrode assembly, and a secondary battery module including the same.

In some embodiments of the disclosed technology, a lithium secondary battery includes an electrode assembly in which a first electrode group including one or more first unit cells and a second electrode group including one or more second unit cells are alternately stacked. The first unit cell includes a first anode including a first anode current collector and a first anode mixture layer on the first anode current collector, the first anode mixture layer includes a 1-1 anode mixture layer on the first anode current collector and a 1-2 anode mixture layer on the 1-1 anode mixture layer, the second unit cell includes a second anode including a second anode current collector and a second anode mixture layer on the second anode current collector, the second anode mixture layer includes a 2-1 anode mixture layer on the second anode current collector and a 2-2 anode mixture layer on the 2-1 anode mixture layer, the 1-1 anode mixture layer, the 1-2 anode mixture layer, the 2-1 anode mixture layer, and the 2-2 anode mixture layer each contain a silicon-based active material, a weight ratio of the silicon-based active material in the 1-2 anode mixture layer is greater than a weight ratio of the silicon-based active material in the 1-1 anode mixture layer, and a weight ratio of the silicon-based active material in the 2-2 anode mixture layer is less than or equal to a weight ratio of the silicon-based active material in the 2-1 anode mixture layer.

A content of the silicon-based active material in the first anode mixture layer may be 0.1 to 30% by weight based on a total weight of the first anode mixture layer, and a content of the silicon-based active material in the second anode mixture layer may be 0.1 to 30% by weight based on a total weight of the second anode mixture layer.

A content of the silicon-based active material in the 1-1 anode mixture layer may be 0.1 to 30% by weight based on a total weight of the 1-1 anode mixture layer, and a content of the silicon-based active material in the 1-2 anode mixture layer may be 0.1 to 30% by weight based on a total weight of the 1-2 anode mixture layer.

A content of the silicon-based active material in the 2-1 anode mixture layer may be 0.1 to 30% by weight based on a total weight of the 2-1 anode mixture layer, and a content of the silicon-based active material in the 2-2 anode mixture layer may be 0.1 to 30% by weight based on a total weight of the 2-2 anode mixture layer.

Each of the silicon-based active materials in the 1-1 anode mixture layer, the 1-2 anode mixture layer, the 2-1 anode mixture layer and the 2-2 anode mixture layer may be at least one silicon-based active material selected from the group consisting of Si, $SiO_x$ ($0<x<2$), an Si-Q alloy (where the Q is an element selected from the group consisting of alkali metals, alkaline earth metals, Group 13 elements, Group 14 elements, Group 15 elements, Group 16 elements, transition metals, rare earth elements, and combinations thereof, but not Si), and Si—C composites.

A loading weight (LW) ratio of the 1-1 anode mixture layer and the 1-2 anode mixture layer may be 1:3 to 3:1.

A loading weight (LW) ratio of the 2-1 anode mixture layer and the 2-2 anode mixture layer may be 1:3 to 3:1.

The electrode assembly may satisfy conditions of Equation 1: $0.1<A1/A2<3.0$, where A1 is a total number of the first unit cells, and A2 is a total number of the second unit cells.

The electrode assembly may satisfy conditions of Equation 2: $0.1<B1/B2<3.0$, where B1 is a total number of the first electrode groups, and B2 is a total number of the second electrode groups.

The first anode and the second anode may include a first anode uncoated portion and a second anode uncoated portion protruding in the same direction, respectively, and the first anode uncoated portion and the second anode uncoated portion may be located in different positions based on a protruding surface.

A width of the first anode uncoated portion and the second anode uncoated portion may be 15 to 45 mm.

A thickness of the first anode uncoated portion and the second anode uncoated portion may be 6 to 20 μm.

The lithium secondary battery may include a first anode tab formed by combining one or more first anode uncoated portions, and a second anode tab formed by combining one or more second anode uncoated portions, and the first anode tab and the second anode tab may be connected to a first anode lead and a second anode lead different from each other, respectively.

The first anode lead and the second anode lead may be arranged to be parallel to each other.

The first anode lead and the second anode lead may be connected to one lead film.

In some embodiments of the disclosed technology, a secondary battery module includes the lithium secondary battery described above.

In some embodiments of the disclosed technology, a secondary battery pack includes the secondary battery module described above.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
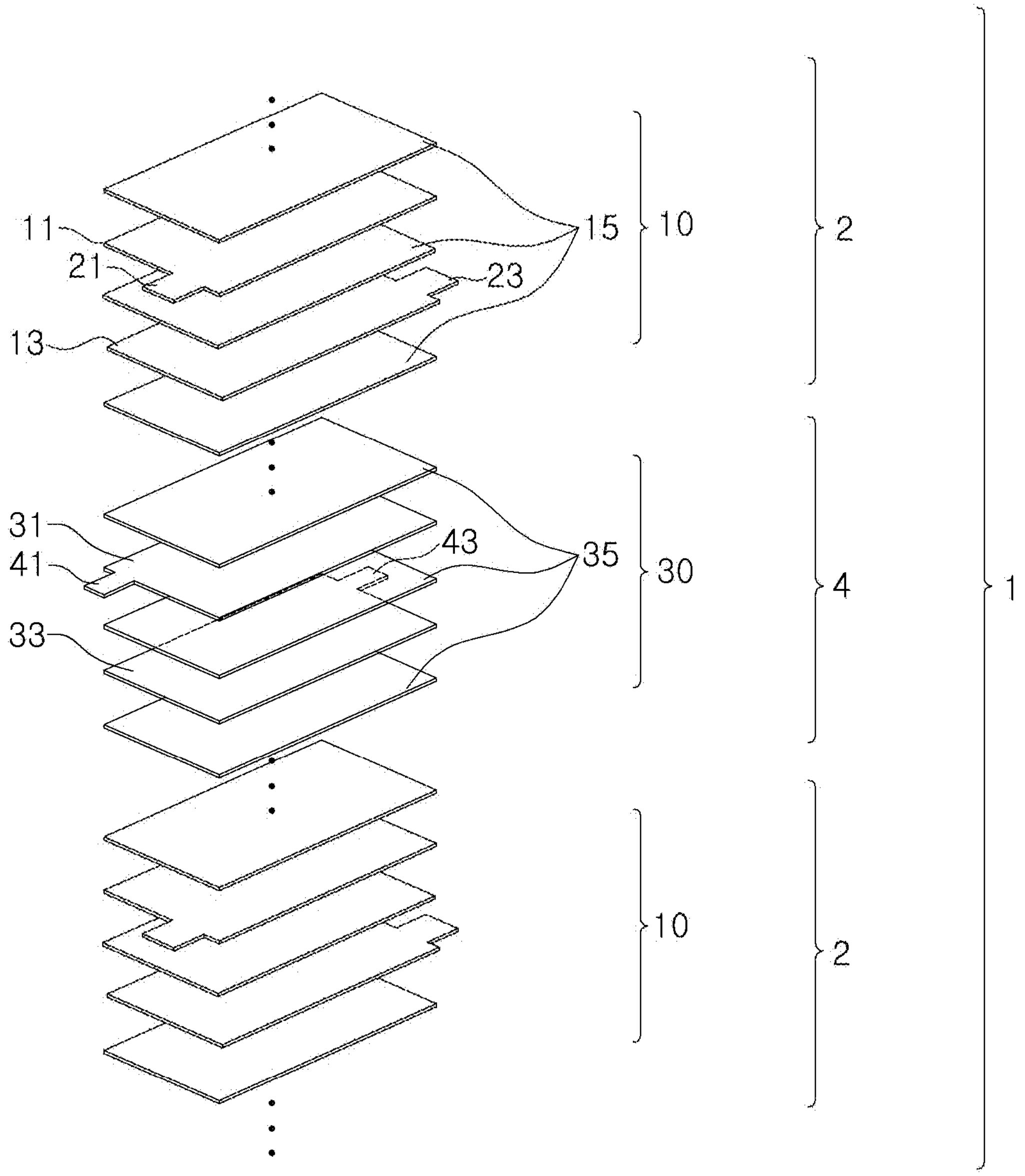
FIG. 1 is a perspective view conceptually illustrating a stack structure of a first unit cell and a second unit cell according to an embodiment.

Features of the disclosed technology disclosed in this patent document are described by example embodiments with reference to the accompanying drawings.

The disclosed technology may be implemented in some embodiments to provide a

Hereinafter, embodiments of the disclosed technology will be described. However, the embodiment of the disclosed technology may be modified in many different forms, and the scope of the disclosed technology is not limited to the embodiments described below.

In this specification, when a part is said to be connected to another part, this includes not only the case where it is directly connected but also the case where it is indirectly connected with another element interposed therebetween. In addition, including a certain component does not exclude other components unless otherwise stated, but means that other components may be further included.

In this specification, a unit cell is the smallest structural unit of a secondary battery including a cathode, an anode, and a separator interposed therebetween.

In the present specification, the electrode group is a structural unit including one or more of the unit cells, and the first electrode group and the second electrode group to be described below mean a group of electrodes respectively including a structure in which the first unit cell and the second unit cell are stacked.

In the present specification, the electrode assembly is a structural unit including one or more of the first electrode group and the second electrode group, and means a configuration including a structure in which the first electrode group and the second electrode group are stacked.

In the present specification, the uncoated portion is a portion in which the active material layer is not coated in the anode or the cathode current collector, and means a portion located on at least one surface of the current collector.

Lithium Secondary Battery

A lithium secondary battery according to an embodiment an electrode assembly 1 in which a first electrode group 2 including one or more first unit cells 10 and a second electrode group 4 including one or more second unit cells 30 are alternately stacked, and the first unit cell 10 includes a first anode 11 including a first anode current collector 110 and a first anode mixture layer 111 on the first anode current collector. The first anode mixture layer 111 includes a 1-1 anode mixture layer 111$a$ on the first anode current collector, and a 1-2 anode mixture layer 111$b$ on the 1-1 anode mixture layer. The second unit cell 30 includes a second anode 31 including a second anode current collector 310 and a second anode mixture layer 311 on the second anode current collector, and the second anode mixture layer 311 includes a 2-1 anode mixture layer 311$a$ on the second anode current collector and a 2-2 anode mixture layer 311$b$ on the 2-1 anode mixture layer. The 1-1 anode mixture layer, the 1-2 anode mixture layer, the 2-1 anode mixture layer, and the 2-2 anode mixture layer each contain a silicon-based active material. The weight ratio of the silicon-based active material in the 1-2 anode mixture layer is greater than the weight ratio of the silicon-based active material in the 1-1 anode mixture layer. The weight ratio of the silicon-based active material in the 2-2 anode mixture layer is less than or equal to the weight ratio of the silicon-based active material in the 2-1 anode mixture layer.

Hereinafter, the structure of the electrode assembly included in the lithium secondary battery will be described in detail with reference to FIG. 1.

Electrode Assembly Structure

FIG. 1 is a perspective view conceptually illustrating a stack structure of a first unit cell and a second unit cell according to an embodiment.

Referring to FIG. 1, the lithium secondary battery includes an electrode assembly 1 in which a first electrode group 2 including one or more first unit cells 10 and a second electrode group 4 including one or more second unit cells 30 are alternately stacked.

The first unit cell 10 and the second unit cell 30 may respectively have a bi-cell structure (cathode-separator-anode-separator-cathode) in which electrodes of the same polarity are located at both ends of the unit cell, or a mono-cell structure (cathode-separator-anode). However, since the unit cell may have a structure in which a plurality of bicells and monocells are stacked according to the design use and the like, the structures of the first unit cell and the second unit cell are not limited to the above range.

The first unit cell 10 includes the first anode 11, and the second unit cell 30 includes the second anode 31. The first unit cell 10 may further include a first cathode 13 and a first separator 15, and the second unit cell 30 may further include a second cathode 33 and a second separator 35.

The first electrode group 2 and the second electrode group 4 may include anodes having different active material contents, layer structures, and the like, and may have different electrochemical performances. Accordingly, the electrode assembly including the first electrode group and the second electrode group may secure excellent levels of energy density, lifespan characteristics, output characteristics, and fast charging characteristics.

Hereinafter, the first anode 11 and the second anode 31 included in the first electrode group 2 and the second electrode group 4, respectively, will be described in detail with reference to FIGS. 2A and 2B.

Anode Design

Figure 2A:
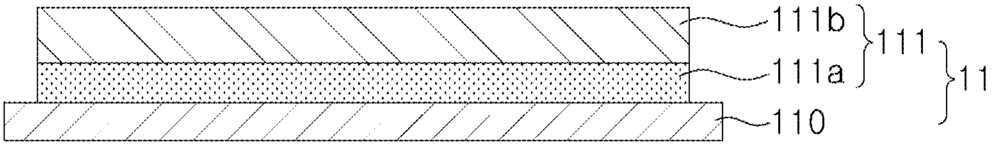
FIG. 2A is a cross-sectional view illustrating the structure of a first anode according to an embodiment.

FIG. 2A is a cross-sectional view illustrating the structure of a first anode according to an embodiment.

Figure 2B:
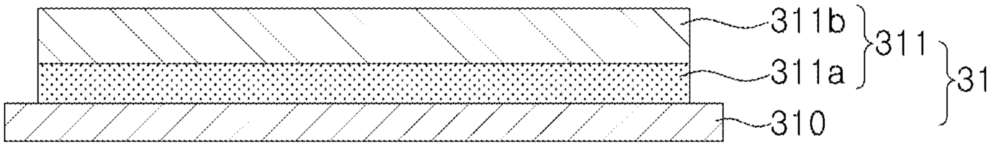
FIG. 2B is a cross-sectional view illustrating the structure of a second negative according to an embodiment.

FIG. 2B is a cross-sectional view illustrating the structure of a second anode according to an embodiment.

The first anode 11 and the second anode 31 each have a multilayer structure in which two or more active material layers are stacked. The first anode includes a first anode current collector 110, and a first anode mixture layer 111 on the first anode current collector, and the first anode mixture layer may include a 1-1 anode mixture layer 111*a* on the first anode current collector, and a 1-2 anode mixture layer 111*b* on the 1-1 anode mixture layer. In addition, the second anode 31 includes a second anode current collector 310, and a second anode mixture layer 311 on the second anode current collector, and the second anode mixture layer may include a 2-1 anode mixture layer 311*a* on the second anode current collector, and a 2-2 anode mixture layer 311*b* on the 2-1 anode mixture layer.

According to an embodiment, as both the first anode and the second anode to which stack structures of anode mixture layers having different active material contents are applied differently are included, a lithium secondary battery having excellent high-rate charging characteristics, energy density, lifespan characteristics, and the like may be provided.

The first anode current collector 110 and the second anode current collector 310 are current collectors commonly applied to anodes, but are not particularly limited, and for example, in detail, copper foil (Cu-Foil) may be used.

The 1-1 anode mixture layer 111*a*, 1-2 anode mixture layer 111*b*, 2-1 anode mixture layer 311*a* and 2-2 anode mixture layer 311*b* each contain a silicon-based active material. The silicon-based active material in the 1-1 anode mixture layer, 1-2 anode mixture layer, 2-1 anode mixture layer and 2-2 anode mixture layer may be at least one silicon-based active material selected from the group consisting of Si, $SiO_x$ (0<x<2), Si-Q alloys (wherein Q is an element selected from the group consisting of an alkali metal, an alkaline earth metal, a group 13 element, a group 14 element, a group 15 element, a group 16 element, a transition metal, a rare earth element, and combinations thereof, but is not Si), and a Si—C composite.

The silicon-based active material may include one or more types of silicon-based active material particles selected from the group described above. In this case, the silicon-based active material may further include a carbon coating layer formed on the silicon-based active material particles. Accordingly, the silicon-based active material particles may be prevented from contacting moisture in the air and/or water in the anode slurry, and a decrease in the discharge capacity of the secondary battery may also be suppressed.

The carbon coating layer may include at least one selected from the group consisting of amorphous carbon, carbon nanotubes, carbon nanofibers, graphite, graphene, graphene oxide, and reduced graphene oxide.

In addition, the silicon-based active material may include metal-doped silicon-based active material particles. In this case, as the metal, an alkali metal such as lithium (Li), magnesium (Mg) or the like, or an alkaline earth metal such as calcium (Ca) or the like may be used alone or in combination of two or more. In detail, the silicon-based active material may include silicon-based active material particles doped with magnesium (Mg). The silicon-based active material doped with metal includes micropores and may thus effectively suppresses expansion of the silicon-based active material during charge/discharge, and prevents swelling and cracking of the electrode during charging and discharging, thereby improving rapid charge lifespan characteristics and cycle characteristics at room temperature of the lithium secondary battery.

The silicon-based active material may be differently applied for each unit cell or each anode mixture layer according to the design usage. In detail, the 1-1 anode mixture layer 111*a* and the 2-1 anode mixture layer 311*a* may include SiOx (0<x<2) as a silicon-based active material, the 1-2 anode mixture layer 111*b* may include SiOx (0<x<2) doped with magnesium (Mg) as a silicon-based active material, and the 2-2 anode mixture layer 311*b* may include a Si—C composite as a silicon-based active material.

As a silicon-based active material included in the 1-2 anode mixture layer 111*b*, which is an upper layer in the first anode 11 having a multilayer structure included in the first electrode group 2, when SiOx (0<x<2) doped with magnesium (Mg) is applied, even if a relatively large amount of silicon-based active material is included in the upper layer, occurrence of swelling of the electrode and the like during charging and discharging may be effectively suppressed, and accordingly, it may be easy to design the silicon-based active material content of the upper layer to be relatively higher than a silicon-based active material content of the lower layer. Accordingly, the first anode 11, and the first unit cell 10 and the first electrode group 2 including the same, having excellent capacity characteristics and high-rate charging characteristics and excellent volume expansion control characteristics, may be provided.

In the multilayered second anode 31 included in the second electrode group 4, a Si—C composite having high capacity characteristics is applied as a silicon-based active material included in the 2-2 anode mixture layer 311*b*, which is an upper layer, the silicon-based active material may be contained in a relatively small amount, as compared to general silicon oxide (SiOx) active materials, and it may be easy to design the silicon-based active material content of the lower layer to be relatively higher than a silicon-based active material content of the upper layer. Accordingly, the content of the silicon-based active material in the entire anode is reduced, thereby alleviating problems caused by electrode expansion, and the second anode 31 of which the performance is further improved, and the second unit cell 30 and the second electrode group 4 including the same, may be provided.

The content of the silicon-based active material in the first anode mixture layer 111 may be 0.1 to 30% by weight based on the total weight of the first anode mixture layer, and the content of the silicon-based active material in the second anode mixture layer 311 may be 0.1 to 30% by weight based on the total weight of the second anode mixture layer. In detail, the content of the silicon-based active material in the first anode mixture layer 111 may be 1 to 15% by weight based on the total weight of the first anode mixture layer, and the content of the silicon-based active material in the second anode mixture layer 311 may be 1 to 15% by weight based on the total weight of the second anode mixture layer.

According to an aspect of the disclosed technology, the content of the silicon-based active material in the anode mixture layer of the stack structure may be differently adjusted for each anode as follows.

The weight ratio of the silicon-based active material in the 1-2 anode mixture layer 111*b* is greater than the weight ratio of the silicon-based active material in the 1-1 anode mixture layer 111*a*. In detail, within a range that satisfies the condition that the weight ratio of the silicon-based active material in the 1-2 anode mixture layer 111*b* is greater than the weight ratio of the silicon-based active material in the 1-1 anode mixture layer 111*a*; the content of the silicon-based active material in the 1-1 anode mixture layer 111*a* may be 0.1 to 30% by weight based on the total weight of the 1-1 anode mixture layer, and the content of the silicon-based active material in the 1-2 anode mixture layer 111*b* may be 0.1 to 30% by weight based on the total weight of the 1-2 anode mixture layer. In more detail, the content of the silicon-based active material in the 1-1 anode mixture layer 111*a* may be 1 to 8% by weight based on the total weight of the 1-1 anode mixture layer, and the content of the silicon-based active material in the 1-2 anode mixture layer 111*b* may be 9 to 15% by weight based on the total weight of the 1-2 anode mixture layer.

When the content characteristics of the silicon-based active material for each layer of the 1-1 anode mixture layer 111*a* and the 1-2 anode mixture layer 111*b* are adjusted as described above, the content of the silicon-based active material included in the lower layer (the 1-1 anode mixture layer) directly in contact with the first anode current collector 110 is adjusted to be a relatively low level, and thus, phenomena such as appearance distortion and outermost detachment due to volume expansion/contraction of the silicon-based active material may be alleviated. In addition, by adjusting the content of the silicon-based active material contained in the upper layer (1-2 anode mixture layer) in direct contact with the electrolyte to be relatively high, the movement of lithium ions may be smoothly induced, and high-rate characteristics may be secured at an excellent level. Accordingly, the first anode 11, the first unit cell 10, and the first electrode group 2 including the anode mixture layers may have excellent fast charging characteristics while preventing problems caused by volume expansion/contraction of the silicon-based active material.

The weight ratio of the silicon-based active material in the 2-2 anode mixture layer 311*b* is less than or equal to the weight ratio of the silicon-based active material in the 2-1 anode mixture layer 311*a*. In detail, within a range that satisfies the condition that the weight ratio of the silicon-based active material in the 2-2 anode mixture layer 311*b* is less than or equal to the weight ratio of the silicon-based active material in the 2-1 anode mixture layer 311*a*; the content of the silicon-based active material in the 2-1 anode mixture layer 311*a* may be 0.1 to 30% by weight based on the total weight of the 2-1 anode mixture layer, and the content of the silicon-based active material in the 2-2 anode mixture layer 311*b* may be 0.1 to 30% by weight based on the total weight of the 2-2 anode mixture layer. In more detail, the content of the silicon-based active material in the 2-1 anode mixture layer 311*a* may be 8 to 15% by weight based on the total weight of the 2-1 anode mixture layer, and the content of the silicon-based active material in the 2-2 anode mixture layer 311*b* may be 1 to 8% by weight based on the total weight of the 2-2 anode mixture layer.

When the content characteristics of the silicon-based active material for each layer of the 2-1 anode mixture layer 311*a* and the 2-2 anode mixture layer 311*b* are adjusted as described above, the cell capacity may be improved by adjusting the content of the silicon-based active material included in the lower layer (the 2-1 anode mixture layer) in direct contact with the second anode current collector 310 to be relatively high. In addition, by adjusting the content of the silicon-based active material included in the upper layer (the 2nd-2nd anode mixture layer) in direct contact with the electrolyte to be relatively low such that the content of the silicon-based active material is lowered as the entire anode, the lifespan retention rate of the battery may be improved. Accordingly, the second anode 31, the second unit cell 30, and the second electrode group 4 including the anode mixture layers may have excellent energy density and lifespan characteristics.

The lithium secondary battery according to an embodiment includes the electrode assembly 1 introducing the configuration in which a first electrode group 2 having excellent high-rate charging characteristics and a low volume expansion rate and a second electrode group 4 having relatively excellent lifespan retention rates and energy densities and the like are alternately stacked, and therefore, lifespan characteristics, energy density, rapid charging characteristics, and the like may be relatively excellent.

In addition, even if the second unit cell 30 expands due to the second anode 31, which is relatively affected by the volume expansion of the silicon-based active material, since the first unit cell 10 including the first anode 11, which is relatively less affected by this effect, is stacked on the upper and lower portions, the volume expansion of the silicon-based active material in the Z-axis (thickness direction) may be uniformly suppressed by the physical pressure or the like.

On the other hand, the ratio of the loading weight (LW) of each layer in the first anode mixture layer 111 and the ratio of the loading weight (LW) of each layer in the second anode mixture layer 311 may be adjusted in consideration of the content characteristics of the silicon-based active material in each anode mixture layer. The loading weight (LW) indicates that the amount of the anode mixture layer formed on the current collector, for example, the layer including the active material, the binder, the conductive material, and the like, formed on the current collector, is represented in units of weight per area. In this case, the area is based on the area of the current collector, and the weight is based on the total weight of the formed anode mixture layer.

A loading weight (LW) ratio of the 1-1 anode mixture layer and the 1-2 anode mixture layer may be 1:3 to 3:1. In addition, the loading weight (LW) ratio of the 2-1 anode mixture layer and the 2-2 anode mixture layer may be 1:3 to 3:1.

A total loading weight (LW) of the first anode mixture layer may be 5 to 17 mg/$cm^2$. In detail, the loading weight (LW) of the 1-1 anode mixture layer may be 2.75 to 8.25 mg/$cm^2$, and the loading weight (LW) of the 1-2 anode mixture layer may be 2.75 to 8.25 mg/$cm^2$.

A total loading weight (LW) of the second anode mixture layer may be 4 to 12 mg/$cm^2$. In detail, the loading weight (LW) of the 2-1 anode mixture layer may be 2.0 to 6.0 mg/$cm^2$, k and the loading weight (LW) of the 2-2 anode mixture layer may be 2.0 to 6.0 mg/$cm^2$.

In the case of adjusting the loading weight (LW) value and ratio of each anode mixture layer for each anode as described above, even in the case in which the content ratios of the silicon-based active material for respective layers are different, the content of the silicon-based active material may be adjusted within an appropriate range based on the entire anode, and thus, a high-capacity anode may be manufactured without causing problems due to volume expansion/contraction of the silicon-based active material.

The first anode 11 and the second anode 31 may each further include a carbon-based active material, a binder, and a conductive material. In detail, the 1-1 anode mixture layer 111*a*, the 1-2 anode mixture layer 111*b*, the 2-1 anode mixture layer 311*a* and the 2-2 anode mixture layer 311*b* may each include a carbon-based active material, a binder, and a conductive material.

The carbon-based active material may include one or more carbon-based active materials selected from among, for example, crystalline artificial graphite, crystalline natural graphite, amorphous hard carbon, low crystalline soft carbon, carbon black, acetylene black, Ketjen black, Super P, graphene, and fibrous carbon.

The content of the carbon-based active material in the 1-1 anode mixture layer 111*a* may be 60 to 99.79% by weight, and in detail, may be 82 to 98.89% by weight. In addition, the content of the carbon-based active material in the 1-2 anode mixture layer 111*b* may be 60 to 99.79% by weight, and in detail, may be 75 to 90.89% by weight.

The content of the carbon-based active material in the 2-1 anode mixture layer 311*a* may be 60 to 99.79% by weight, and in detail, may be 82 to 98.89% by weight. In addition, the content of the carbon-based active material in the 2-2 anode mixture layer 311*b* may be 60 to 99.79% by weight, and in detail, may be 75 to 91.89% by weight.

The binder may be, for example, rubber-based binders such as styrene-butadiene rubber (SBR), fluorine-based rubber, ethylene propylene rubber, butyl acrylate rubber, butadiene rubber, isoprene rubber, acrylonitrile rubber, acrylic rubber, silane-based rubber, and/or water-soluble polymeric binders such as carboxymethylcellulose (CMC), hydroxypropylmethylcellulose, methylcellulose, polyacrylic acid (PAA), polyvinyl alcohol (PVA), and polyvinyl alcohol-polyacrylic acid copolymer (PVA-PAA Copolymer).

The binder content in the 1-1 anode mixture layer 111*a*, the binder content in the 1-2 anode mixture layer 111*b*, the binder content in the 2-1 anode mixture layer 311*a*, and the binder content in the 2-2 anode mixture layer 311*b* may each be 0.1 to 5% by weight.

The conductive material may be, for example, graphite such as natural graphite or artificial graphite; carbon-based active materials such as carbon black, acetylene black, ketjen black, channel black, furnace black, lamp black, summer black, and carbon nanotubes; metal powders or metal fibers such as copper, nickel, aluminum, and silver; conductive whiskers such as zinc oxide and potassium titanate; conductive metal oxides such as titanium oxide; conductive polymers such as polyphenylene derivatives, or the like, and one thereof alone or a mixture of two or more may be used.

The content of the conductive material in the 1-1 anode mixture layer 111*a*, the content of the conductive material in the 1-2 anode mixture layer 111*b*, the content of the conductive material in the 2-1 anode mixture layer 311*a*, the content of the conductive material in the 2-2 anode mixture layer 311*b* may each be 0.01 to 5% by weight.

A method of manufacturing the first anode 11 and the second anode 31 is not particularly limited, and may be performed by a known method. For example, by applying and drying a 1-1 anode slurry containing a 1-1 solvent, a 1-1 carbon-based active material, a 1-1 silicon-based active material, a 1-1 binder, and a 1-1 conductive material on the first anode current collector 110 by a method such as bar coating, casting, spraying or the like, the 1-1 anode mixture layer 111*a* may be formed, and then, by applying and drying a 1-2 anode slurry containing a 1-2 solvent, a 1-2 carbon-based active material, a 1-2 silicon-based active material, a 1-2 binder, and a 1-2 conductive material on the 1-1 anode mixture layer by a method such as bar coating, casting, spraying, or the like, the first anode 11 may be manufactured by using the method of the 1-2 anode mixture layer 111*b*. The second anode 31 may also be manufactured in the same manner.

The solvent may be, for example, dimethyl sulfoxide (DMSO), isopropyl alcohol, N-methylpyrrolidone (NMP), acetone or water, and as the amount of the solvent used, it is sufficient to dissolve or disperse the active material, conductive material, and binder in consideration of the coating thickness and manufacturing yield of the composition for forming the anode mixture layer, and to have a viscosity capable of exhibiting excellent thickness uniformity during subsequent application to form the anode mixture layer.

Each of the first cathode 13 and the second cathode 33 may include a lithium-transition metal composite oxide as an active material. In detail, the lithium-transition metal composite oxide may be an NCM-based cathode active material represented by chemical formula: $Li_xNi_aCo_bMn_cO_y$ ($0<x\leq1.1$, $2\leq y\leq2.02$, $0<a<1$, $0<b<1$, $0<c<1$, $0<a+b+c\leq1$), but is not limited thereto.

The first separator 15 and the second separator 35 may be respectively polyolefin-based polymer separators such as polyethylene and polypropylene, glass fiber, polyester, polytetrafluoroethylene or combinations thereof, and may be in the form of non-woven fabric or woven fabric. In addition, the separators may be coated with a composition containing a ceramic component and the like to secure heat resistance or mechanical strength, and optionally, may be composed of a single-layer or multilayer structure. As such, as the first separator 15 and the second separator 35, separators known in the art may be used, and the disclosed technology is not limited within the above range.

Hereinafter, the structure in which the first electrode group 2 and the second electrode group 4 are stacked will be described in detail with reference to FIGS. 1 and 3A to 4E.

Electrode Group Stack Structure

FIG. 1 is a perspective view conceptually illustrating a stack structure of a first unit cell and a second unit cell according to an embodiment.

Figure 3A:
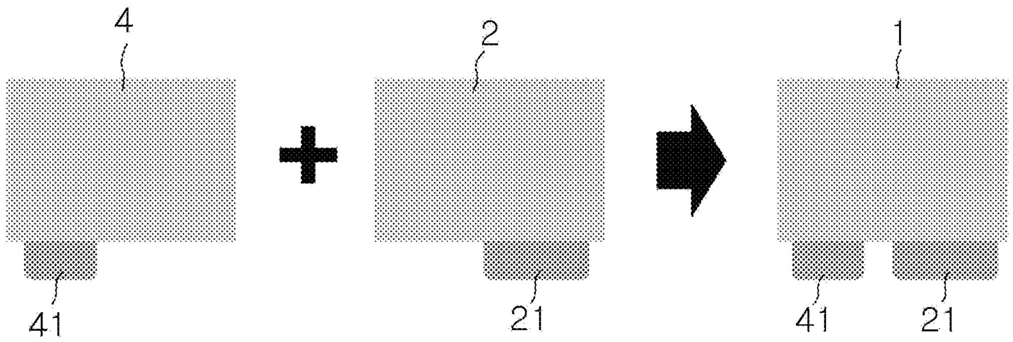
FIGS. 3A and 4A are plan views illustrating stack structures of a first electrode group and a second electrode group as viewed from above, which are respective stack structures according to an embodiment.
Figure 4A:
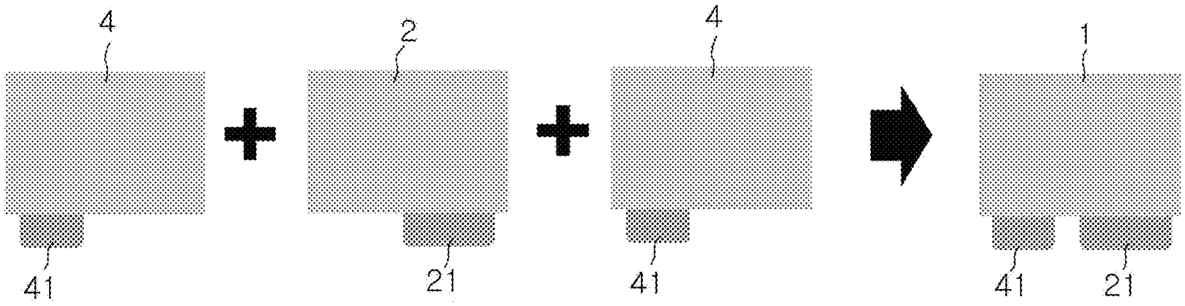

FIGS. 3A and 4A are stack structures according to an embodiment, respectively, and are plan views illustrating the form of the stack structure of the first electrode group and the second electrode group observed from above.

Figure 3B:
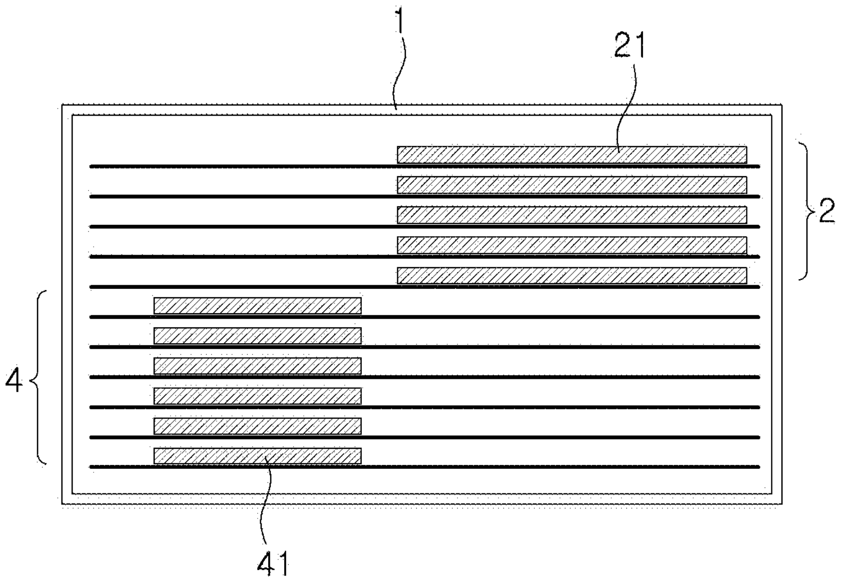
FIGS. 3B and 4B are front views of a stack structure according to an embodiment, and respectively illustrate forms in which stack structures of a first electrode group and a second electrode group are observed based on the surface where an anode uncoated portion protrudes.
Figure 4B:
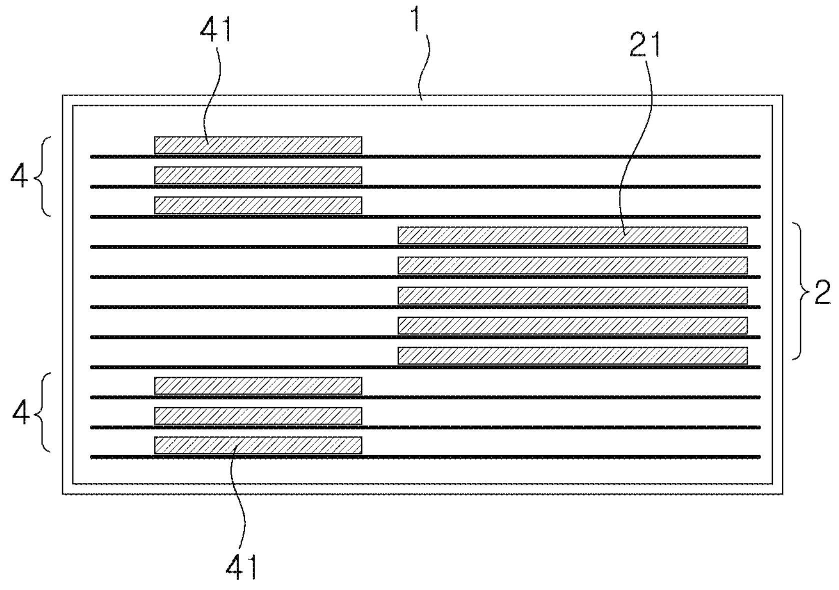

FIGS. 3B and 4B are stack structures according to an embodiment, respectively, and are front views illustrating the stack structure of the first electrode group and the second electrode group, observed based on the surface where the anode uncoated portion protrudes.

Figure 3C:
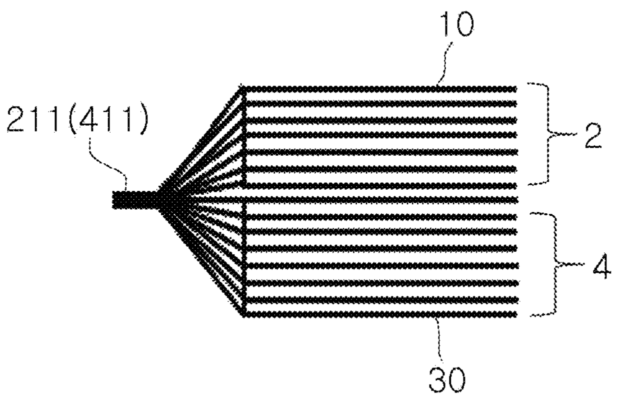
FIGS. 3C and 4C are diagrams illustrating a stack structure of a first electrode group and a second electrode group in an electrode assembly according to an embodiment as viewed from the side.
Figure 4C:
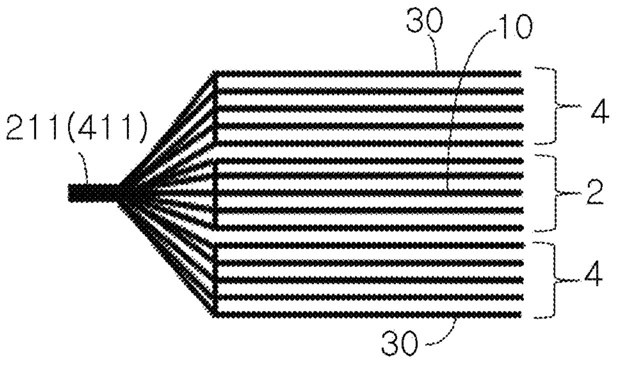

FIGS. 3C and 4C are diagrams illustrating a stack structure of a first electrode group and a second electrode group observed from the side in an electrode assembly according to an embodiment.

Figure 3D:
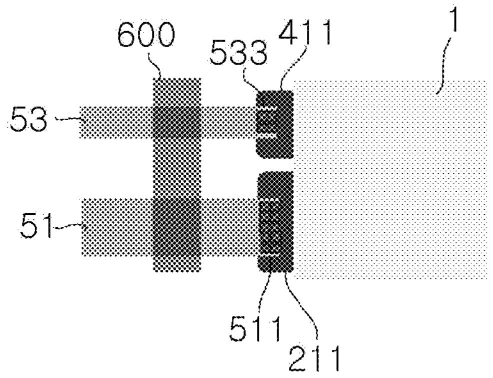
FIGS. 3D and 4D are plan views illustrating a connection structure between an electrode tab and an electrode lead of respective electrode groups in an electrode assembly according to an embodiment, observed from above.
Figure 4D:
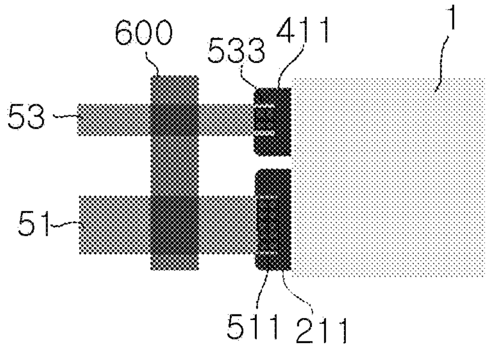

FIGS. 3D and 4D are plan views illustrating a top view of a connection structure between an electrode tab and an electrode lead of each electrode group in an electrode assembly according to an embodiment.

Figure 3E:
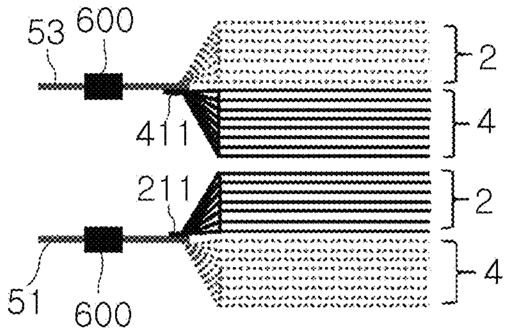
FIGS. 3E and 4E are diagrams illustrating a connection structure between each electrode tab and electrode lead of an electrode group in an electrode assembly according to an embodiment, observed from the side.
Figure 4E:
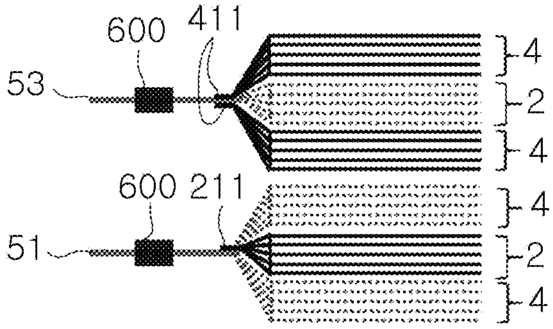

FIGS. 3E and 4E are diagrams illustrating the connection structure between each electrode tab and electrode lead of an electrode group in an electrode assembly according to an embodiment, observed from the side.

In a lithium secondary battery according to an embodiment, the first unit cell 10 and the second unit cell 30 may each include an uncoated portion protruding in the same direction with respect to electrodes having the same polarity (please refer to FIG. 1, FIGS. 3A to 3B, and FIGS. 4A to 4B). In detail, the first anode 11 and the second anode 31 may include a first anode uncoated portion 21 and a second anode uncoated portion 41 protruding in the same direction, respectively. In addition, the first cathode 13 and the second cathode 33 may include a first cathode uncoated portion 23 and a second cathode uncoated portion 43 protruding in the same direction (in a direction different from the protruding direction of the first anode uncoated portion 21 and the second anode uncoated portion 41), respectively.

The first anode uncoated portion 21 and the second anode uncoated portion 41 may be disposed on different positions relative to the protruding surface. In detail, the first anode uncoated portion 21 may be formed on the right side with respect to the protruding surface, and the second anode uncoated portion 41 may be formed on the left side with respect to the protruding surface (see FIGS. 1, 3A to 3B, and 4A to 4B), or vice versa.

The first cathode uncoated portion 23 and the second cathode uncoated portion 43 may be disposed on different positions relative to the protruding surface. In detail, the first cathode uncoated portion 23 may be formed on the left side of the protruding surface, and the second cathode uncoated portion 43 may be formed on the right side of the protruding surface (see FIGS. 1, 3A to 3B, and 4A to 4B), or vice versa.

In this manner, the first anode uncoated portion 21 and the second anode uncoated portion 41, and the first cathode uncoated portion 23 and the second cathode uncoated portion 43, are respectively disposed at different positions (in detail, biased to the left/right axis, respectively) in the direction of the surface protruding with respect to the electrode of the same polarity, and thus, utilization of the internal space may be significantly increased through the electrode design that connects respective electrode tabs to a plurality of independent electrode leads, which will be described below, and the energy density of respective electrode groups and the electrode assembly may be significantly improved.

Widths of the first anode uncoated portion and the second anode uncoated portion may be 15 to 45 mm. In addition, the width of the first cathode uncoated portion and the second cathode uncoated portion may be 15 to 45 mm.

The first anode uncoated portion and the second anode uncoated portion may have a thickness of 6 μm to 20 μm. In addition, the thickness of the first cathode uncoated portion and the second cathode uncoated portion may be 8 to 20 μm.

On the other hand, the electrode group stack structure according to an embodiment is a structure in which the first electrode group 2 including one or more of the first unit cells 10 and the second electrode group 4 including one or more second unit cells 30 are alternately stacked, and may be a structure arranged in the order (A-B-A-B) of 'first electrode group-second electrode group-first electrode group-second electrode group' (see FIGS. 3A to 3E).

In addition, the electrode group stack structure according to another embodiment may be a structure in which the second electrode group 4 including one or more of the second unit cells 30, the first electrode group 2 including one or more first unit cells 10, and the second electrode group 4 including one or more second unit cells 30 are alternately stacked, and may be a structure arranged in the order (B-A-B-B-A-B) of 'second electrode group-first electrode group-second electrode group-second electrode group-first electrode group-second electrode group' (see FIGS. 4A to 4E).

A lithium secondary battery according to an embodiment may include an electrode assembly 1 that satisfies the condition of Equation 1 below.

$$0.1<A1/A2<3.0 \quad \text{[Equation 1]}$$

In Equation 1, A1 is the total number of the first unit cells, and A2 is the total number of the second unit cells.

In detail, the A1/A2 value may be 1.0 to 2.5, and may be 1.5 to 2.0. In addition, the A1 value may be 1 to 40, and may be 10 to 30. In addition, the A2 value may be 1 to 20, and may be 5 to 15.

A lithium secondary battery according to an embodiment may include an electrode assembly 1 that satisfies the condition of Equation 2 below.

$$0.1<B1/B2<3.0 \quad \text{[Equation 2]}$$

In Equation 2, B1 is the total number of the first electrode groups, and B2 is the total number of the second electrode groups. In detail, the B1/B2 value may be 0.3 to 1.0.

When the ratio of the total number of each of the first unit cells 10 and the second unit cells 30, the ratio of the total number of the first electrode groups 2 and the second electrode groups 4, and the like are within the aforementioned range, the number of first unit cells and first electrode groups with excellent high rate characteristics and volume expansion control characteristics and the number of second unit cells and second electrode groups with excellent capacity characteristics and lifespan characteristics may be properly adjusted, thereby manufacturing a hybrid type secondary battery being excellent in high rate characteristics, volume expansion control characteristics, capacity characteristics, lifespan characteristics, and the like In the first electrode group 2 including one or more first unit cells 10, the first anode uncoated portions 21 included in respective first unit cells 10 are coupled to form a first anode tab 211. For example, the lithium secondary battery may include the first anode tab 211 formed by combining one or more first anode uncoated portions 21. Similarly, in the second electrode group 4 including one or more second unit cells 30, the second anode uncoated portions 41 included in respective second unit cells 30 are coupled to form a second anode tab 411. For example, the lithium secondary battery may include the second anode tab 411 formed by combining one or more second anode uncoated portions 41.

The first anode tab 211 and the second anode tab 411 may be connected to different first anode leads 51 and second anode leads 53, respectively. In detail, the first anode lead and the second anode lead may be arranged to be parallel to each other, and the first anode lead 51 and the second anode lead 53 may be connected to one lead film 600. Accordingly, the first unit cell 10 and the second unit cell 30 may be connected to independent electrode leads, respectively, and may input and output currents of different magnitudes simultaneously or independently from one battery.

The first anode tab 211 and the first anode lead 51 may be connected through a first coupling portion 511 formed therebetween, and the second anode tab 411 and the second anode lead 53 may be connected through a second coupling portion 533 formed therebetween. The first coupling portion 511 and the second coupling portion 533 serve as paths for current input and output, and may have different sizes (thickness, width, length, and the like) to reduce internal resistance.

The first coupling portion 511 and the second coupling portion 533 may include different materials. As an example, only one of the first coupling portion 511 and the second coupling portion 533 may include a resistance reduction coating layer, but the disclosed technology is not limited thereto.

In the case of the electrode group stack structure according to an embodiment (FIGS. 3A to 3E), the first anode tab 211 located on the upper portion in the thickness direction with respect to the first anode lead 51 is coupled to the upper portion of the first anode lead 51, and the first coupling portion 511 may be formed above the first anode lead 51. On the other hand, the second anode tab 411 located at the lower part in the thickness direction based on the second anode lead 53 is coupled to the lower part of the second anode lead 53, and the second coupling portion 533 may be formed below the second anode lead 53.

In the case of the electrode group stack structure according to another embodiment (FIGS. 4A to 4E), the first anode tab 211 located on the upper portion in the thickness direction with respect to the first anode lead 51 is coupled to the upper portion of the first anode lead 51, and the first coupling portion 511 may be formed above the first anode lead 51. On the other hand, the second anode tab 411 located at the upper part in the thickness direction based on the second anode lead 53 is coupled to the upper part of the second anode lead 53, and the second anode tab 411 positioned at the lower portion may be coupled to the lower portion of the second anode lead 53. Accordingly, the second coupling portion 533 may be formed both above and below the second anode lead 53.

The electrode group stack structure, electrode tab-electrode lead connection structure, and the like of the disclosed technology are not limited to the above embodiments, and may be configured differently depending on the design use.

When the above-described stack structure and connection structure are applied, even if a plurality of electrode groups are stacked, asymmetric expansion of the uncoated area and the like may be prevented, and thus, the occurrence of problems such as uncoated portion breakage and the like may be mitigated.

The above-described technical features of the anode tab, anode lead, coupling portion, and the like may be equally applied to the cathode, and detailed description thereof is omitted because it is redundant.

A lithium secondary battery according to an embodiment may be manufactured by inserting the electrode assembly 1 including the structure in which the first electrode group 2 and the second electrode group 4 are alternately stacked, respectively, into a battery case, and then injecting an electrolyte solution.

The electrode assembly 1 may be a stack type, lamination/stack type or stack/folding type electrode assembly.

As the battery case, a battery case commonly used in the art may be applied. As an example, the battery case may be a cylindrical shape, a prismatic shape, a pouch shape, or a coin shape, and in detail, may be a pouch shape. In addition, the battery case may have a structure in which an insulating layer, an adhesive layer, a metal thin film, and the like are stacked. The metal thin film may include aluminum (Al) or the like to secure mechanical strength of the case and block moisture and oxygen.

The electrolyte solution includes an organic solvent and a lithium salt. The organic solvent serves as a medium through which ions involved in the electrochemical reaction of the battery may move, and for example, carbonate-based, ester-based, ether-based, ketone-based, alcohol-based or aprotic solvents may be used alone or in combination of two or more. In this case, when two or more types are mixed and used, the mixing ratio may be appropriately adjusted according to the required battery performance. The lithium salt is dissolved in an organic solvent and acts as a source of lithium ions in the battery, and is a material that enables the operation of a basic lithium secondary battery and promotes the movement of lithium ions between the cathode and the anode. As the lithium salt, a known material may be used at a concentration suitable for the use. The electrolyte solution may further include a known solvent to improve charge/discharge characteristics, flame retardancy characteristics, and the like, if necessary, and may include known additives.

Battery Modules and Packs

A secondary battery module according to an embodiment includes the lithium secondary battery described above. In detail, the secondary battery module is a battery module including a plurality of the above-described lithium secondary batteries, and includes a plurality of electrode assemblies in which two types of electrode groups having different electrochemical performances are alternately stacked, and may be excellent in lifespan characteristics, rapid charging characteristics, energy density, and the like.

A secondary battery pack according to an embodiment includes the secondary battery module. In detail, the secondary battery pack may be used as a battery pack in which a plurality of secondary battery modules including the above-described lithium secondary battery are coupled and connected. Utilization of the secondary battery pack as a power unit for medium-large devices such as power tools, electric vehicles (EVs), hybrid electric vehicles (HEVs), and plug-in hybrid electric vehicles (PHEVs) may be excellent.

Hereinafter, examples are presented to aid understanding of the disclosed technology, but these examples are only illustrative of the disclosed technology and do not limit the scope of the appended claims. Various changes and modifications to the embodiments may be made by those skilled in the art within the scope and spirit of the disclosed technology, which also fall within the scope of the appended claims.

Example

1) Manufacture of Unit Cells

A first unit cell and a second unit cell, which are anodes having a multilayer structure, were prepared according to Examples and Comparative Examples, respectively, in which the coating ratio (loading weight basis) for each anode mixture layer, and the contents of a silicon-based active material (SiOx-based silicon oxide; 0<x<2) and a carbon-based active material are illustrated in Table 1 below.

2) Manufacture of Electrode Assembly

By alternately stacking one first electrode group comprised of 20 first unit cells and two second electrode groups comprised of 11 second unit cells, stacked electrode assemblies as illustrated in FIGS. 4A to 4E were manufactured. On the other hand, the uncoated portions of the same polarity were stacked so that the protruding directions are formed in parallel in the same direction, and the protruding positions of the uncoated portions were disposed in different positions depending on the configuration of the unit cells. In detail, the uncoated portion (first anode uncoated portion) of the first electrode group comprised of the first unit cells was configured to be deflected to the right, and the uncoated portion (second anode uncoated portion) of the second electrode group comprised of the second unit cells was configured to be deflected to the left. The distance between the first anode uncoated portion in the first electrode group and the second anode uncoated portion in the second electrode group was configured to maintain 8.0 mm in consideration of safety during charging and discharging, and the width of the first anode uncoated portion was 35.0 mm, and the width of the second anode uncoated portion was 25.0 mm.

Subsequently, the first anode tab formed by combining the first anode uncoated portion in the first electrode group through ultrasonic welding was connected to the first anode lead, and the second anode tab formed by combining the second anode uncoated portion in the second electrode group was connected to the second anode lead. In this case, the first anode tab was connected to be located on the upper part with respect to the first anode lead in the thickness direction, and the second anode tabs were connected to be respectively positioned on upper and lower portions in the thickness direction with respect to the second anode lead (see FIG. 4E). In this manner, when the anode tab is fused with the anode lead by ultrasonic welding, the degrees of extension of the plurality of respective uncoated portions may be equally adjusted by fusion to the upper and lower portions of the anode lead, respectively, thereby significantly reducing occurrence of defects such as tearing of the substrate and the like.

3) Manufacture of Secondary Battery

Each of the prepared electrode assemblies was placed in a pouch case and sealed on three sides except for the electrolyte injection side. At this time, the portion with the electrode tab was sealed to be included in the sealing portion. The electrolyte solution was injected through the remaining surface except for the sealing portion, and after sealing the remaining surface, it was impregnated for 12 hours or more. The electrolyte was prepared by dissolving 1.1M $LiPF_6$ in a mixed solvent of EC/EMC (25/75; volume ratio) and then by adding 8% by weight of fluoroethylene carbonate (FEC), 0.5% by weight of 1,3-propanesultone (PRS), and 1.0% by weight of 1,3-propanesultone (PS). Thereafter, heat press pre-charging was performed for 60 minutes with a current corresponding to an average of 0.5 C. After stabilization for 12 hours or more, degassing was performed, and after aging for 24 hours or more, chemical charging and discharging was performed (charging conditions: CC-CV, 0.25 C, 4.2V, 0.05 C, CUT-OFF; discharging conditions: CC, 0.25 C, 2.5V, CUT-OFF). Then, standard charging and discharging was performed (charging conditions: CC-CV, 0.33 C, 4.2V, 0.05 C, CUT-OFF; discharging conditions: CC, 0.33 C, 2.5V, CUT-OFF).

TABLE 1

| | First Electrode Group | | | | Second Electrode Group | | | |
|---|---|---|---|---|---|---|---|---|
| | 1st unit cell upper and lower layers | | | First Unit Cell Total | 2nd unit cell upper and lower layers | | | Second Unit Cell Total |
| Division | Si-based active material | Coating Rate (%) | Si-based active material content (wt %) | Si-based active material content (wt %) | Si-based active material | Coating Rate (%) | Si-based active material content (wt %) | Si-based active material content (wt %) |
| Example 1 | B:A | 75:25 (3:1) | 10:2 (5:1) | 8 | C:A | 50:50 (1:1) | 8:8 | 8 |
| Example 2 | B:A | 50:50 (1:1) | 14:2 (7:1) | 8 | C:A | 50:50 (1:1) | 8:8 | 8 |
| Example 3 | B:A | 50:50 (1:1) | 9:7 (1.29:1) | 8 | C:A | 50:50 (1:1) | 8:8 | 8 |
| Comparative Example 1 | B:A | 25:75 (1:3) | 2:10 (0.2:1) | 8 | C:A | 50:50 (1:1) | 8:8 | 8 |
| Comparative Example 2 | A | 100:0 | 8:0 | 8 | C:A | 50:50 (1:1) | 8:8 | 8 |
| Comparative Example 3 | B:A | 75:25 (3:1) | 10:2 (5:1) | 8 | A | 100:0 | 8:0 | 8 |

※ Silicon-based active material A: SiOx, Silicon-based active material B: Mg-doped SiOx, Silicon-based active material C: Si—C composite 4) Performance Evaluation (1) Energy Density Lithium secondary batteries manufactured according to Examples 1 to 3 and Comparative Examples 1 to 3 were charged with a constant current at a current of 0.3 C rate until the voltage reached 4.2V, and subsequently, constant voltage charging was performed by cutting off at a current of 0.05 C rate while maintaining 4.2V in constant voltage mode. After that, the discharge capacity (Ah) and energy (Wh) were measured by discharging with a constant current of 0.3 C rate until the voltage reached 2.5V, the volume-energy density was calculated by measuring the volume of each cell in the state of charge of 4.2V, and the results are summarized in Table 2 below.

TABLE 2

| Division | Total number of stacks of anode | Number of first unit cell stacks | Number of second unit cell stacks | Energy Density (Wh/L) |
|---|---|---|---|---|
| Example 1 | 42 | 20 | 22 | 739 |
| Example 2 | 42 | 20 | 22 | 741 |
| Example 3 | 42 | 20 | 22 | 738 |
| Comparative Example 1 | 42 | 20 | 22 | 736 |
| Comparative Example 2 | 42 | 20 | 22 | 735 |
| Comparative Example 3 | 42 | 20 | 22 | 737 |

(2) Evaluation of Electrode Volume Expansion Rate and Evaluation of Electrode Detachment After charging (CC/CV 0.1 C 0.01V (vs. Li) 0.01 C CUT-OFF) the lithium secondary batteries prepared according to Examples 1 and 3 and Comparative Examples 1 and 2 at room temperature (25° C.) and disassembled, the thicknesses of the charged first and second unit cells were measured.

The anode thicknesses (SOC 0, $t_1$) of the uncharged first unit cell and second unit cell and the anode thicknesses (SOC 100, $t_2$) of the charged first unit cell and second unit cell were measured, and the electrode volume expansion rate was calculated through Equation 3 below, and the results are summarized in Table 3 below.

$$\text{Expansion rate } (\%)=(t_2-t_1)/(t_1-\text{current collector thickness})\times 100 \quad \text{[Equation 3]}$$

In Equation 3, the current collector thickness is the thickness of the anode current collector used in manufacturing the secondary battery anode.

The charged first and second unit cells were left at room temperature (25° C.) for 10 minutes without a separate washing process to visually check the state of the adhesive surface with the active material layer on the substrate surface, and the results are summarized in Table 3 below. When there is no electrode detachment when visually checking the charged first unit cell and second unit cell, it is marked as "-".

TABLE 3

| | First Unit Cell | | | | | | |
|---|---|---|---|---|---|---|---|
| | Si-based active | Coating | Si-based active material content | Volume Expansion Rate (%) | | Electrode Detachment | |
| Division | material content (wt %) | Rate (LW) (upper/lower layer) | ratio (upper/lower layer) | First Unit Cell | Second Unit Cell | First Unit Cell | Second Unit Cell |
| Example 1 | 8.0 | 3:1 | 5:1 | 31.7 | 21.8 | — | — |
| Example 3 | 8.0 | 1:1 | 1.29:1 | 30.2 | 22.0 | — | — |
| Comparative Example 1 | 8.0 | 1:3 | 1:5 | 31.3 | 21.7 | Detachment | — |
| Comparative Example 2 | 8.0 | — | — | 32.3 | 21.8 | — | — |

(3) Resistance Characteristics

The lithium secondary batteries prepared according to Examples 1 and 3 and Comparative Examples 1 to 3 were set to 50% SOC at 25° C., rested for 1 hour, and then discharged at 1 C current for 10 seconds to measure resistance characteristics, and the results are illustrated in Table 4. In detail, the resistance value of the lithium secondary battery sample was measured according to the following Equation 4, and the results are illustrated in Table 4.

$$R=(V_0-V_1)/I \quad \text{[Equation 4]}$$

In Equation 4, R is the resistance value of the lithium secondary battery, $V_0$ is the voltage of the lithium secondary battery measured after a rest period of 1 hour after setting the SOC to 50% at 25° C., $V_1$ is the voltage of the lithium secondary battery measured after discharging at 1 C current for 10 seconds, and I is the 1 C current value.

(4) Output Characteristics

For the lithium secondary batteries prepared in Examples 1 and 3 and Comparative Examples 1 to 3, charge (CC/CV 0.3 C 4.2V 0.05 C CUT-OFF) and discharge (CC 0.3 C 2.5V CUT-OFF) at room temperature (25° C.) were performed twice. After that, by discharging (CC 0.3 C) from the charging (CC/CV 0.3 C 4.2V 0.05 C CUT-OFF) state to the S0050 point, the output (W/kg) at the time of discharging and charging at the S0050 point was measured, and the results are summarized in Table 4 below.

TABLE 4

| Division | 1st unit cell upper and lower layers: Coating Rate (LW) (upper/lower layer) | 1st unit cell upper and lower layers: Si-based active material content ratio (upper/lower layer) | 2nd unit cell upper and lower layers: Coating Rate (LW) (upper/lower layer) | 2nd unit cell upper and lower layers: Si-based active material content ratio (upper/lower layer) | Resistance (mΩ) | Discharge Output (W/kg) | Charge Output (W/kg) |
|---|---|---|---|---|---|---|---|
| Example 1 | 3:1 | 5:1 | 1:1 | 1:1 | 0.995 | 3344 | 2713 |
| Example 3 | 1:1 | 1.29:1 | 1:1 | 1:1 | 1.010 | 3259 | 2635 |
| Comparative Example 1 | 1:3 | 1:5 | 1:1 | 1:1 | 1.015 | 3245 | 2620 |
| Comparative Example 2 | — | — | 1:1 | 1:1 | 1.010 | 3253 | 2616 |
| Comparative Example 3 | 3:1 | 5:1 | — | — | 1.005 | 3307 | 2606 |

(5) Lifespan Characteristics (Normal Lifespan/Rapid Charge Lifespan)

[Evaluation of General Lifespan Characteristics]

Lithium secondary batteries manufactured according to Examples 1 and 3 and Comparative Examples 1 to 3 were evaluated for general charge lifespan characteristics in the range of DOD94 (SOC4-98) in a chamber maintained at 25° C. Under constant current/constant voltage (CC/CV) conditions, it was charged at 0.3 C to the voltage corresponding to SOC98 and then cut off at 0.05 C. After that, it was discharged at 0.3 C to the voltage corresponding to SOC4 under constant current (CC) conditions, and the discharge capacity was measured. After this was repeated for 500 cycles, the discharge capacity retention rate of the general (room temperature) lifespan characteristic evaluation was measured, and the results are summarized in Table 5 below.

[Evaluation of Rapid Charging Lifespan Characteristics]

Lithium secondary batteries prepared according to Examples 1 and 3 and Comparative Examples 1 to 3 were charged at a C-rate within the range of 3.25 C/3.0 C/2.75 C/2.5 C/2.25 C/2.0 C/1.75 C/1.5 C/1.25 C/1.0 C/0.75 C/0.5 C to reach DOD72 within 25 minutes according to the step charging method, and then, were discharged at ⅓C. The rapid charging evaluation was performed by repeating the charging and discharging cycle as one cycle. After repeating 300 cycles with a waiting time of 10 minutes between charge and discharge cycles, the rapid charge capacity retention rate was measured, and the results are summarized in Table 5 below.

When the discharge capacity was so low that it was difficult to measure before 300 cycles of charging and discharging, it is marked as "-".

TABLE 5

| Division | 1st unit cell upper and lower layers: Coating Rate (LW) (upper/lower layer) | 1st unit cell upper and lower layers: Si-based active material content ratio (upper/lower layer) | 2nd unit cell upper and lower layers: Coating Rate (LW) (upper/lower layer) | 2nd unit cell upper and lower layers: Si-based active material content ratio (upper/lower layer) | Normal lifespan capacity retention rate (500 cycles, %) | Rapid charge capacity retention rate (300 cycles, %) |
|---|---|---|---|---|---|---|
| Example 1 | 3:1 | 5:1 | 1:1 | 1:1 | 94.8 | 93.4 |
| Example 3 | 1:1 | 1.29:1 | 1:1 | 1:1 | 94.3 | 91.7 |
| Comparative Example 1 | 1:3 | 1:5 | 1:1 | 1:1 | 92.5 | — |
| Comparative Example 2 | — | — | 1:1 | 1:1 | 93.7 | 90.1 |
| Comparative Example 3 | 3:1 | 5:1 | — | — | 94.4 | 89.2 |

Referring to Tables 1 to 5, in the case of Comparative Example 1 in which the silicon-based active material content of the lower layer in the anode of the first unit cell included in the first electrode group is relatively higher, electrode detachment occurred in the first unit cell, and resistance characteristics, output characteristics, lifespan characteristics, and the like were found to be relatively inferior. On the other hand, in the case of Comparative Example 2 in which the anode of the first unit cell included in the first electrode group is not a multilayer structure, the volume expansion rate of the first unit cell was relatively high, and the output characteristics, lifespan characteristics and the like were relatively inferior. In addition, in the case of Comparative Example 3 in which the anode of the second unit cell included in the second electrode group is not a multilayer structure, it was found that the rapid charging characteristics were relatively inferior.

Therefore, when a secondary battery is designed to include two types of electrode groups in which the characteristics of each layer are properly controlled in the multilayered anode as in Examples 1 to 3, it is determined that the occurrence of appearance distortion, outermost electrode detachment and the like due to volume expansion and contraction of the silicon-based active material in the secondary battery is mitigated, and a secondary battery excellent in capacity/resistance/output/lifespan characteristics and the like may be provided.

As set forth above, according to an embodiment, a high energy density is secured by including a silicon-based active material in the anode, and as two types of electrode groups having different multilayer structure designs of the anode are included in the electrode assembly, occurrence of appearance distortion, outermost electrode detachment, and the like due to volume expansion and contraction of the silicon-based active material in the secondary battery may be alleviated.

According to an embodiment, two types of electrode groups having different electrochemical properties are respectively welded to independent electrode leads, and therefore, depending on the design usage, currents of different magnitudes may be simultaneously secured from one battery, thereby providing a secondary battery having excellent output characteristics and a secondary battery module including the same.

Only specific examples of implementations of certain embodiments are described. Variations, improvements and enhancements of the disclosed embodiments and other embodiments may be made based on the disclosure of this patent document.

What is claimed is:

1. A lithium secondary battery comprising:

an electrode assembly in which a first electrode group including one or more first unit cells and a second electrode group including one or more second unit cells are alternately stacked, wherein the first unit cell includes a first anode including a first anode current collector and a first anode mixture layer on the first anode current collector, the first anode mixture layer includes a 1-1 anode mixture layer on the first anode current collector and a 1-2 anode mixture layer on the 1-1 anode mixture layer, the second unit cell includes a second anode including a second anode current collector and a second anode mixture layer on the second anode current collector, the second anode mixture layer includes a 2-1 anode mixture layer on the second anode current collector and a 2-2 anode mixture layer on the 2-1 anode mixture layer, wherein the 1-2 anode mixture layer includes SiOx (0<x<2) doped with magnesium (Mg) and the 2-2 anode mixture layer includes Si—C composite as a silicon-based active material, and the 1-1 anode mixture layer, the 1-2 anode mixture layer, the 2-1 anode mixture layer, and the 2-2 anode mixture layer each contain a silicon-based active material, a weight ratio of the silicon-based active material in the 1-2 anode mixture layer is greater than a weight ratio of the silicon-based active material in the 1-1 anode mixture layer, and a weight ratio of the silicon-based active material in the 2-2 anode mixture layer is less than or equal to a weight ratio of the silicon-based active material in the 2-1 anode mixture layer.

2. The lithium secondary battery of claim 1, wherein a content of the silicon-based active material in the first anode mixture layer is 0.1 to 30% by weight based on a total weight of the first anode mixture layer, and a content of the silicon-based active material in the second anode mixture layer is 0.1 to 30% by weight based on a total weight of the second anode mixture layer.

3. The lithium secondary battery of claim 1, wherein a content of the silicon-based active material in the 1-1 anode mixture layer is 0.1 to 30% by weight based on a total weight of the 1-1 anode mixture layer, and a content of the silicon-based active material in the 1-2 anode mixture layer is 0.1 to 30% by weight based on a total weight of the 1-2 anode mixture layer.

4. The lithium secondary battery of claim 1, wherein a content of the silicon-based active material in the 2-1 anode mixture layer is 0.1 to 30% by weight based on a total weight of the 2-1 anode mixture layer, and a content of the silicon-based active material in the 2-2 anode mixture layer is 0.1 to 30% by weight based on a total weight of the 2-2 anode mixture layer.

5. The lithium secondary battery of claim 1, wherein each of the silicon-based active materials in the 1-1 anode mixture layer, the 1-2 anode mixture layer, the 2-1 anode mixture layer and the 2-2 anode mixture layer is at least one silicon-based active material selected from the group consisting of Si, SiOx (0<x<2), an Si-Q alloy (where the Q is an element selected from the group consisting of alkali metals, alkaline earth metals, Group 13 elements, Group 14 elements, Group 15 elements, Group 16 elements, transition metals, rare earth elements, and combinations thereof, but not Si), and Si—C composites.

6. The lithium secondary battery of claim 1, wherein a loading weight (LW) ratio of the 1-1 anode mixture layer and the 1-2 anode mixture layer is 1:3 to 3:1.

7. The lithium secondary battery of claim 1, wherein a loading weight (LW) ratio of the 2-1 anode mixture layer and the 2-2 anode mixture layer is 1:3 to 3:1.

8. The lithium secondary battery of claim 1, wherein the electrode assembly satisfies conditions of Equation 1:$0.1<A1/A2<3.0$, where A1 is a total number of the first unit cells, and A2 is a total number of the second unit cells.

9. The lithium secondary battery of claim 1, wherein the electrode assembly satisfies conditions of Equation 2:$0.1<B1/B2<3.0$, where B1 is a total number of the first electrode groups, and B2 is a total number of the second electrode groups.

10. The lithium secondary battery of claim 1, wherein the first anode and the second anode include a first anode uncoated portion and a second anode uncoated portion protruding in the same direction, respectively, wherein the first anode uncoated portion and the second anode uncoated portion are located in different positions based on a protruding surface.

11. The lithium secondary battery of claim 10, wherein a width of the first anode uncoated portion and the second anode uncoated portion is 15 to 45 mm.

12. The lithium secondary battery of claim 10, wherein a thickness of the first anode uncoated portion and the second anode uncoated portion is 6 to 20 μm.

13. The lithium secondary battery of claim 10, comprising a first anode tab formed by combining one or more first anode uncoated portions, and a second anode tab formed by combining one or more second anode uncoated portions, wherein the first anode tab and the second anode tab are connected to a first anode lead and a second anode lead different from each other, respectively.

14. The lithium secondary battery of claim 13, wherein the first anode lead and the second anode lead are arranged to be parallel to each other.

15. The lithium secondary battery of claim 13, wherein the first anode lead and the second anode lead are connected to one lead film.

16. A secondary battery module comprising:

the lithium secondary battery according to claim 1.

17. A secondary battery pack comprising:

the secondary battery module according to claim 16.

* * * * *